United States Patent [19]
Kimura et al.

[11] 4,408,372
[45] Oct. 11, 1983

[54] COUPLER

[75] Inventors: Teiji Kimura, Urayasu; Shigeru Kimura, Kamakura, both of Japan

[73] Assignees: Sony Corporation, Tokyo; Nifco Inc., Yokohama, both of Japan

[21] Appl. No.: 198,726

[22] Filed: Oct. 20, 1980

[30] Foreign Application Priority Data

Oct. 24, 1979 [JP] Japan ............................ 54-146229[U]

[51] Int. Cl.³ ............................................. A44B 21/00
[52] U.S. Cl. ....................................... 24/217 R; 411/61
[58] Field of Search ...................... 24/216, 217 R, 210; 411/60, 61, 219, 208 R

[56] References Cited

U.S. PATENT DOCUMENTS

| 3,054,145 | 9/1962 | Helpa | 411/908 |
|---|---|---|---|
| 3,056,852 | 10/1962 | Sachs | 411/60 |
| 3,153,468 | 10/1964 | Sweeney | 24/216 |
| 3,250,170 | 5/1966 | Siegel | 411/61 |
| 3,916,756 | 11/1975 | Yoda | 24/217 R |
| 4,176,428 | 12/1979 | Kimura | 24/217 R |

FOREIGN PATENT DOCUMENTS

| 970263 | 7/1975 | Canada | 411/61 |
|---|---|---|---|
| 51-99259 | 8/1976 | Japan . | |
| 53-160742 | 12/1978 | Japan . | |
| 885876 | 12/1961 | United Kingdom | 411/61 |

Primary Examiner—Robert A. Hafer
Attorney, Agent, or Firm—Trexler, Bushnell & Wolters, Ltd.

[57] ABSTRACT

A coupler for joining two objects comprises an insertion member attached fast to one of the objects and a reception member attached fast to the other object and used for admitting the insertion member into fast engagement therewith. The insertion member is provided with a setting portion for fast attachment to the aforementioned one object and a shaft extended from the setting portion and possessed of a radially expanded engaging portion at the leading end thereof. The reception member is provided with two generally semicylindrical shells connected to each other through a thin-walled hinge portion and adapted to form one cylindrical shape upon being closed onto each other along the matched edges thereof and a plurality of resilient engaging pieces regularly spaced in the longitudinal direction on the inner wall of each of the shells.

2 Claims, 5 Drawing Figures

COUPLER

BACKGROUND OF THE INVENTION

This invention relates to a coupler which is conveniently used when one object is to be joined detachably to another object. More particularly, this invention relates to a coupler which advantageously functions as a fastener for joining two objects of nature such that, after their mutual attachment by the fastener, they may at times be required to be separated from each other for some reason or other as in the case of the attachment of a decorative panel to the baffle plate in a speaker box, for example. Particularly in the case of a decorative panel, there is generally entailed a requirement that the panel and the plate should be joined at a plurality of points by using as many couplers besides the requirement that they should be attached to and detached from each other at will. In ensuring smooth attachment of all the couplers in position in this case, the prime requisite is that the relative position of the individual couplers should be exactly fixed and the coupler should be accurately attached at the fixed positions. Further in the case of a speaker box which gives rise to vibration in use, if the component members of the couplers themselves are not brought into fast engagement, the vibration generated in the box proper causes the loosely joined couplers to shake and adversely affect the acoustic effects the speaker box is expected to produce.

Heretofore, devices of this kind have been disclosed by Japanese Utility Model Laid-open Publication No. 99259/1976 and Japanese Utility Model Laid-open Publication No. 160742/1978, for example.

The former device has a salient feature that the range of tolerable error in the relative positions of a fitting member and a receiving member, i.e. the components of a joiner, can be broadened and the possible shaking of the joiner can be completely absorbed by a pipe-shaped resilient element disposed inside the receiving member. This device depends solely on this salient feature in fulfilling its object. Since this device necessitates provision of the resilient element besides the fitting member incorporating an engaging protuberance and the receiving member and, thus inevitably comprises three major components, it involves a problem of rendering the works of production, assemblage and fixation difficult. As such, the device has not offered satisfactory fabricability in the assembly line.

The latter device relates to a mechanism for attaching a panel to a container case, which comprises an engaging pin incorporating a swelled portion at the leading end thereof and a resilient pin-receiving member provided therein with a funnel portion incorporating at the center thereof a pin-retaining hole of a diameter smaller than the diameter of the swelled portion, with the engaging pin or the pin-receiving member being so adapted as to be attached with freedom of positional adjustment permitted by having bolts inserted with space allowance through insertion holes bored in advance in one of the fitting portions. According to this device, the space allowance provided between the insertion holes and the corresponding bolts permits desired adjustment of the relative fitting positions of the component members of the mechanism. Besides, the insertion of the engaging pin into the pin-receiving hole brings them into freely separable engagement. However, the actual positional adjustment is complicated because it necessitates the plurality of bolts to be tightened independently of one another. Once the swelled portion of the engaging pin is thrust past the pin-retaining hole, it can easily be extracted from the hole because the funnel wall converging into the pin-retaining hole is slanted opposite the direction of extraction. There is even a possibility of the swelled portion breaking the funnel portion so seriously as to render the mechanism no longer reusable.

SUMMARY OF THE INVENTION

The present invention has issued from the efforts made to overcome the various disadvantages suffered by the conventional couplers.

One object of this invention is to provide couplers which, in joining a decorative panel and a baffle plate, can cause the panel and plate to be attached to and detached from each other without experiencing any distortion even when the relative positions fixed for the individual couplers involve slight deviation.

Another object of this invention is to provide couplers capable of preventing the panel and plate from being loosely attached to each other and from consequently generating a shaking motion and other detrimental phenomena.

Still another object of the present invention is to provide couplers which are produced easily as compared with the conventional couplers of the same class and which are advantageous from an economic point of view.

To accomplish the objects described above, according to the present invention, there is provided a coupler for joining two objects which coupler comprises an insertion member adapted to be attached fast to one of the two objects and a reception member adapted to be attached fast to the other object and used for admitting the insertion member into fast engagement therewith, the insertion member being provided with a setting portion for fast attachment to the one object and a shaft extended from the setting portion and possessed of a radially expanded engaging portion at the leading end thereof, and the reception member being provided with two generally semicylindrical shells connected to each other freely openably and closably through the medium of a thin-walled hinge portion and adapted to form one cylindrical shape upon being closed onto each other along the matched edges thereof and a plurality of resilient engaging pieces regularly spaced in the longitudinal direction on the inner wall of each of the shells.

The other objects and characteristic features of the present invention will become apparent from the description to be given hereinafter in detail with reference to the accompanying drawing.

DESCRIPTION OF THE PREFERRED EMBODIMENT

Figure 1:
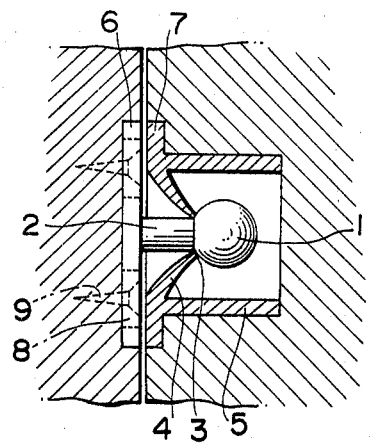
FIG. 1 is an enlarged longitudinal cross section illustrating the condition of union obtained by use of a conventional coupler.

FIG. 1 illustrates a conventional coupler for joining two objects which is disclosed by the aforementioned Japanese Utility Model Laid-open Publication No. 160742/1978. In FIG. 1, reference numeral 2 denotes an engaging pin having a swelled portion 1, and 5 a resilient pin-receiving member provided therein with a funnel portion 4 incorporating at the center thereof a pin-retaining hole 3 of a diameter smaller than that of the swelled portion 1. Denoted by 6 and 7 are fitting portions of the engaging pin 2 and the pin-receiving member 5 respectively. Bolts 9 are inserted with space allowance through insertion holes 8 bored in advance in the fitting portion 6.

Figure 2:
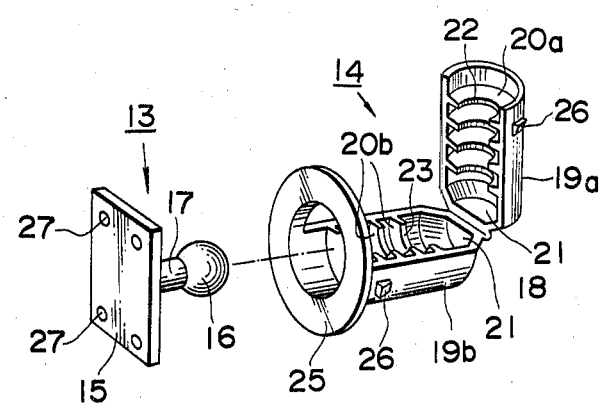
FIG. 2 is an exploded perspective view of the coupler according to the present invention.
Figure 3:
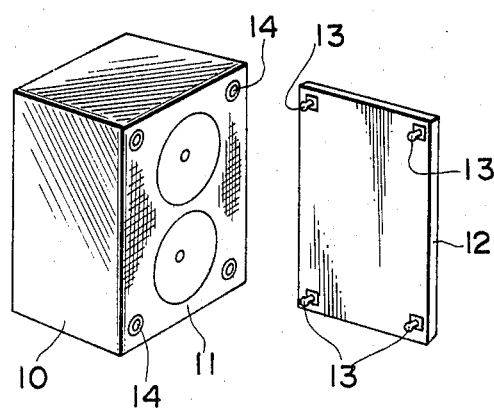
FIG. 3 is a perspective view illustrating a typical use found for the couplers of the present invention.
Figure 4:
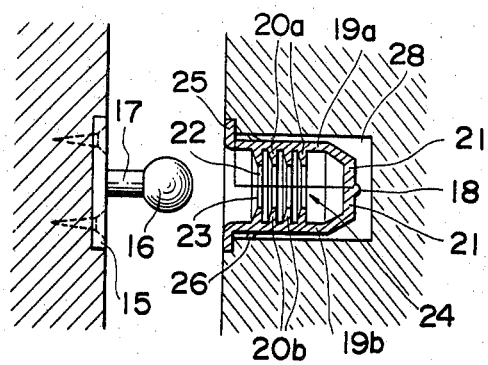
FIG. 4 is a partially sectioned side view illustrating the condition in which the component members of the coupler are separated from each other.

FIG. 2 is an exploded perspective view of one embodiment of the coupler according to the present invention, which coupler comprises an insertion member 13 and a reception member 14. FIG. 3 is a perspective view showing a state wherein the coupler of FIG. 2 is used when a decorative panel 12 is joined detachably to a baffle plate 11 of a speaker box 10. FIG. 4 is a partially sectioned side view illustrating the condition in which the two members 13, 14 are separated from each other.

The coupler of the present invention, as illustrated in FIGS. 2-4, comprises two major components, i.e. an insertion member 13 and a reception member 14. The insertion member 13 is formed of a setting portion 15 and a shaft 17 extended perpendicularly from the center of one side of the setting portion and possessed of a radially expanded engaging portion 16 at the leading end thereof, and the reception member 14 is formed of two generally semicylindrical shells 19a, 19b connected to each other freely openably and closably through the medium of a thin-walled hinge portion 18 and adapted to form one cylindrical shape upon being rotated about the aforementioned hinge portion 18 toward each other and closed onto each other along the matched edges thereof and a plurality of resilient engaging pieces 20a, 20b regularly spaced in the longitudinal direction of the cylinder on the inner wall of the respective shells.

The reception member 14 in the present embodiment has the shells 19a, 19b formed each in a semicylindrical shape having a semicircular cross section. The semicylindrical shells each have one end closed with plates 21, 21 which serve as bottoms of the shells. The adjacent edges of the plates 21, 21 are connected to each other through the medium of a thin-walled hinge portion 18. The resilient engaging pieces 20a, 20b formed on the inner walls of the semicylindrical shells project from the semicircularly curved inner walls of the shells at fixed intervals. These engaging pieces are provided at the center of their free edges with semicircularly notched recesses 22, 23. As described fully afterward, these recesses 22, 23 are adapted so that, when the shells 19a, 19b are rotated about the hinge portion 18 as a fulcrum and brought into intimate contact with each other, they are exactly opposed to each other to give rise to an engaging hole 24 at the center of the two opposed shells to admit the shaft 17 of the aforementioned insertion member 13 into fast engagement therewith. The engaging hole 24 thus formed between the opposed recesses has a diameter smaller than the outside diameter of the engaging portion 16 at the leading end of the shaft 17.

In the diagram, denoted by 25 is an annular flange integrally formed along the edge of the open side of the shell 19b and by 26 is an engaging claw formed protrudingly on the outer wall surface of each of the shells.

The insertion member 13 and the reception member 14 constructed respectively as described above are each molded integrally of a thermoplastic synthetic resin suitably combining rigidity and resiliency. Particularly in the case of the reception member 14, the resilient engaging pieces 20a, 20b on the inner walls of the two shells 19a, 19b are integrally formed and, further, the flange 25 and the engaging claws 26 are formed, all at the same time that the two shells 19a, 19b held in a completely opened state and connected to each other through the medium of the hinge portion 18 are molded.

Of the two members molded as described above, the insertion member 13 has the setting portion 15 thereof applied to the rear surface of the decorative panel 12 and then fastened thereto by inserting screws into through holes 27 bored in the setting portion 15, with the result that the shaft 17 projects in a raised state. The reception member 14, with the two shells 19a, 19b kept in a completely closed state, is inserted into a blind setting hole 28 bored in advance in the front surface of the baffle plate 11 of the speaker box 10 until the flange 25 collides with the baffle plate and the engaging claws 26 formed protrudingly on the outer wall surface of the shells are brought into pressed engagement with the inner wall surface of the blind setting hole. Consequently, the two members are attached respectively to the decorative panel and the baffle plate. In this case, a total of four couplers have their respective component members attached at opposed positions predetermined at the four corners of the baffle plate and the decorative panel similarly to the conventional couplers of the same principle.

After the two component members of each coupler have been set in position as described above, desired attachment of the decorative panel 12 to the baffle plate is accomplished by exactly opposing the shaft 17 of the aforementioned insertion member to the opening of the reception member, pushing the decorative panel toward the baffle plate thereby inserting the shaft into the interior of the cylinder formed by the two shells 19a, 19b, causing the engaging portion 16 formed at the leading end of the shaft to be inserted into tight engagement with the engaging hole 24 formed by the recesses 22, 23 in the resilient engaging pieces 20a, 20b and finally bringing the two members into union.

Figure 5:
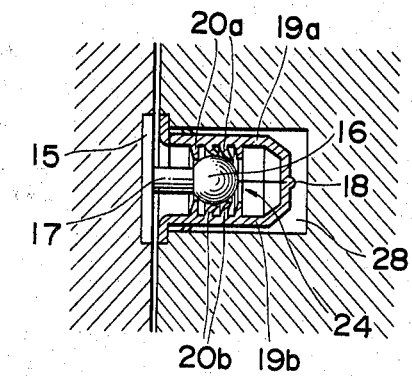
FIG. 5 is a partially sectioned side view illustrating the condition in which the component members of the coupler are held in intimate union.

FIG. 5 illustrates the condition in which the aforementioned two members 13, 14 are united to each other. Since the engaging portion 16 which is forced into the engaging hole 24 by the insertion of the shaft 17 has a diameter greater than the inside diameter of the engaging hole defined by the recesses 22, 23 in the resilient engaging pieces 20a, 20b, it forces its way through the engaging hole by pushing away the resilient engaging pieces. After it has arrived at the end of its own reach inside the reception member, it is compressively embraced within the reception member because of the repulsion exerted by the resilient engaging pieces. Consequently, the insertion member which has been bound to the reception member by the insertion of the shaft 17 is kept in frictional engagement with the reception member by virtue of the embracing force coupled with the squeezing force exerted by the resilient engaging pieces. Thus, the two members are kept in a bound state, enabling the decorative panel to be kept in intimate contact with the baffle plate. When the shaft 17 is extracted against the embracing force of the resilient engaging pieces, the resilient engaging pieces deform by virtue of their resiliency to permit the reverse passage of the engaging portion 16, enabling the insertion member to be separated from the reception member without inflicting any damage to the latter member. In this manner, the panel can be separated from the baffle plate.

As described above, the coupler of the present invention has an advantage that the insertion member and the reception member can be freely attached to and detached from each other without exposing the two members to any immoderate load. When the two members are brought into union, the engaging portion of the shaft is compressively embraced by the squeezing force exerted by the resilient engaging pieces. As a result, the two members are held in intimate contact with each other so tightly that they will never generate any shaking motion even when they are exposed to the vibration of the speaker box.

Further, the shaft which is thrust into the interior of the reception member is received into the engaging hole 24 formed substantially by the opposed resilient engaging pieces as described above. When the shaft's course inside the engaging hole 24 happens to deviate from the exact axis of the engaging hole, the resiliency of the resilient engaging pieces permits the shaft's advance in the course deviating from the axis and, therefore, enables the two members to be brought into perfect union. When the decorative panel is attached by use of a plurality of couplers as described above, the couplers can be fastened without any appreciable distortion even when slight error occurs in the relative positions of the couplers between the panel and the plate.

In addition to the advantage described above, since the coupler of this invention comprises one insertion member and one reception member and these two component members are each capable of integral molding, the coupler of this invention enjoys an advantage of ease of production. Of the two component members, the insertion member can be fastened by use of screws and/or by means of an adhesive agent. The attachment of the insertion member to the given object can be effected by any means available at all. The reception member can be securely fastened to a fitting hole bored in the given object such as the baffle plate when it is pushed into the fitting hole, with the two shells kept in a tightly closed state. Thus, the reception member enjoys an advantage of very high workability.

The union between the insertion member and the reception member is accomplished by virtue of the frictional engagement obtained by the embracing force of the resilient engaging pieces. The binding force with which the two members are kept in this frictional engagement is determined by the strength of the resilient engaging pieces and the diameter of the engaging hole defined by the opposed edges of the resilient engaging pieces. An increase of the binding force is obtained by increasing the wall thickness of the individual resilient engaging pieces and decreasing the diameter of the engaging hole. Desired binding force, therefore, can be freely obtained by suitably adjusting the wall thickness and the diameter mentioned above. A desire to decrease the force of insertion of the shaft, increase the binding force and render the extraction of the shaft from the insertion member difficult is satisfied by simply inclining the direction of the aforementioned resilient engaging pieces 20a, 20b toward the bottom of the shells as illustrated. The design of the coupler enjoys free selection in a fairly wide range.

In the illustrated embodiment, only one flange 25 is disposed on one shell 19b of the reception member. Optionally, the flange 25 may be divided into two halves and the halved flanges may be disposed one each on the shells 19a, 19b so that they form one annular flange when the two shells are closed toward each other. The halved flanges add to ease of molding. When the reception member is attached into the blind fitting hole, however, the seam formed between the two halved flanges is exposed to sight and, therefore, has a disadvantage of spoiling the appearance. The choice between one annular flange and two halved flanges, accordingly, depends on the particular position at which the coupler is put to use.

So far, the application of the coupler of this invention has been described with respect to the attachment of the decorative panel to the speaker box. Of course, this is not the sole use found for the coupler of this invention. The aforementioned effect of the present invention can be fully manifested where two objects can be detachably fastened to each other by use of a plurality of couplers of this invention.

What is claimed is:

1. A coupler for joining two objects, comprising a unitary insertion member adapted to be attached fast to one of said two objects and a reception member adapted to be attached fast to the other object and used for admitting said insertion member into fast engagement therewith, said insertion member being provided with a setting portion for fast attachment to said one object in fixed relation thereto and an integral shaft extended from said setting portion and possessed of a radially expanded engaging portion at the leading and thereof, and said reception member being provided with two generally semicylindrical shells integrally connected to each other freely openably and closably through the medium of a thin-walled integral hinge portion and adapted to form one cylindrical shape upon being closed onto each other along the matched edges thereof and a plurality of like integral resilient engaging pieces regularly spaced in the longitudinal direction on the inner wall of each of the shells, the engaging pieces on one wall being in mirror image with the pieces on the other wall, whereby said reception member is inserted into a fitting hole bored in advance in said other object, with said two shells held in a closed state and consequently said resilient engaging pieces on the inner walls of the shells opposed to each other to enclose therein an engaging hole for admitting said shaft into fast engagement therewith, said engaging hole having a diameter smaller than the outside diameter of the engaging portion to be detachably brought into resilient frictional engagement therewith, at least one opposed pair of engaging pieces being maintained in deformed position by said engaging position of said insertion member.

2. A coupler as set forth in claim 1 wherein the reception member has at least one pair of engaging pieces past which the engaging portion of said insertion member has moved, which pair is in substantially original position.

* * * * *